United States Patent Office 3,326,837
Patented June 20, 1967

3,326,837
THERMOPLASTIC FILMS HAVING IMPROVED
SLIP AND SCRATCH RESISTANCE
James E. Brown, Plainfield, and George M. Harlan,
Somerville, N.J., assignors to Union Carbide Corporation, a corporation of New York
No Drawing. Filed Sept. 23, 1964, Ser. No. 398,760
7 Claims. (Cl. 260—30.8)

This invention relates to thermoplastic films having improved slip and scratch resistance. More particularly, this invention relates to transparent olefin polymer and styrene polymer films having improved slip and scratch resistance which are especially useful in packaging applications.

Thermoplastic films, and transparent olefin polymer and styrene polymer films in particular, have found widespread use in packaging applications. A troublesome problem that has been met with these films, however, has been their inability to readily slide or slip over themselves, other packaging materials, such as cardboard, and packaging machine parts. This inability to slip manifests itself when cut sheets of thermoplastic films are stacked for use in an overwrapping operation. In this instance, an operator finds that a second or third sheet of film accompanies the single sheet he has attempted to remove from the stack. This, of course, results in an undesirable slow-down in the wrapping operation. When the finished packages are stacked in an attempt to align them in an even stack, this inability to slip again crops up and requires that the packages in an uneven stack should be capable of being jostled into proper alignment without the necessity of individual stacking. This inability to slip also causes undesirable joining of packaging machinery.

Another serious problem that has been encountered with thermoplastic films in packaging applications has been their poor resistance to scratching when assembled in package making machinery such as envelope windowing machines. Scratching of thermoplastic films, particularly transparent films, impairs the optical properites of a film and detracts from the overall appearance of a film in an assembled package such as a windowed envelope.

It has now been discovered that these and other problems can be overcome by bringing to at least one surface of a thermoplastic film an alkali metal alkyl sulfate containing from 8 to 20 carbon atoms in an amount sufficient to impart improved slip and scratch resistance to the film. As such, the thermoplastic films described herein are ideally suited for use in packaging applications.

According to this invention, improved slip and scratch resistance is imparted to thermoplastic films in general. However, a particularly noticeable and desirable improvement in slip and scratch resistance is imparted to transparent olefin polymer films because these films are most widely used in packaging applications where slip and scratch resistance is essential. For example, good slip is essential for polyethylene and polystyrene film used as a meat overwrap. In the case of envelope windows, good scratch resistance is essential in order to produce a high quality product.

The term "olefin polymer" is used herein in the generally understood sense to denote normally solid homopolymers of mono-olefinically unsaturated hydrocarbons as well as normally solid copolymers and mixtures thereof including blends of different olefin polymers. The olefin can be a simple olefin of the series $C_nH_{2n}$ or an alpha olefin hydrocarbon as propylene, styrene and the like, and can even contain a minor amount of a monomer copolymerizable therewith which contains polymer producing unsaturation such as is present for example in carbon monoxide and formaldehyde and compounds containing the ethylene linkage $>C=C<$, for example styrene bicycloheptane, 1-butene, vinyl acetate, vinyl formate, methyl methacrylate, monobutyl maleate, 2-ethyl hexyl acrylate, methacrylic acid, ethyl acrylate, neohexene acrylic acid, isoprene, butadiene, acrylamide and the like. The preferred olefin polymer films are polyethylene, polypropylene and styrene polymers chiefly because of their availability, low cost, and superior properties such as transparency and strength.

The term "styrene polymer" is used herein in the generally understood sense to denote normally solid homopolymers of styrene and copolymers thereof with a minor amount of a monomer copolymerizable therewith which contains polymer producing unsaturation such as is present for example in ethylene, propylene, 1-butene, butadiene, vinyl acetate, vinyl formate, methyl methacrylate, 2-ethyl hexyl acrylate, methacrylic acid, ethyl acrylate, acrylic acid, isoprene, acrylonitrile, acrylamide, and the like. The preferred styrene polymer is biaxially oriented styrene homopolymer chiefly because of its availability, low cost and superior properties such as gloss, low haze, strength and transparency.

Any of the alkali metals may be employed in the alkali metal alkyl sulfate. The preferred alkali metal is sodium because of its availability and low cost.

These products are alkali metal salts of fatty alcohol sulfates, i.e. monoesters of sulfuric acid and n-aliphatic alcohols and can contain from 8 to 20 carbon atoms, inclusive. Illustrative of such compounds are sodium oleyl sulfate (C–18), sodium lauryl sulfate (C–12), sodium stearyl sulfate (C–18), sodium myristyl sulfate (C–14), sodium cetyl sulfate (C–16), and the like. For purposes of the present invention, the preferred sulfate is sodium lauryl sulfate because it is readily available commercially and because it imparts a higher degree of improvement in slip and scratch resistance particularly to the preferred olefin polymer and styrene polymer films.

The alkali metal alkyl sulfate can be brought to one or both surfaces of a thermoplastic film either by coating the film with an aqueous solution of the sulfate or by homogeneously incorporating the sulfate into the thermoplastic composition prior to forming it into a film.

When the alkali metal alkyl sulfate is applied as a coating, it is dissolved in water, which may contain other polar solvents such as ethyl alcohol, and other property improving agents, in an amount sufficient to impart improved slip and scratch resistance to a thermoplastic film and less than that which causes the coating solution to undesirably foam and overflow from the coating bath. A solution containing from about 0.25% to about 2%, preferably from about 0.5% to about 1%, by weight, based on the weight of the water of alkali metal alkyl sulfate, generally satisfies these requirements. An aqueous solution of an alkali metal alkyl sulfate can be applied to the surface of a thermoplastic film by any suitable means, by wiping, spraying, dipping, doctoring or like means, a dried coating of an alkali metal alkyl sulfate will generally have a thickness of from about $1 \times 10^{-4}$ mil to about 0.1 mil.

When an alkali metal alkyl sulfate is brought to the surface of a thermoplastic film by solution coating, it is essential that the surface of the thermoplastic film be hydrophilic by which is meant that a thin layer of water placed on the film as by a sponge will not break into discrete islands of liquid within 10 seconds of application. While any known physical or chemical technique can be used for rendering the surface of a thermoplastic film hydrophilic, for instance by flame treating and through the use of chemical reagents, the most convenient method comprises subjecting the thermoplastic film to a corona discharge by passing the film over an insulated roller while discharging a high frequency current, for instance 250–450 kilocycles, through the film. Also, if desired, wetting agents can be incorporated into the coating solution.

When the alkali metal alkyl sulfate is brought to the surface of a thermoplastic film by homogeneously incorporating the sulfate into a film forming composition, it is incorporated in an amount sufficient to impart improved slip and scratch resistance to a thermoplastic film and less than that which causes an increase in haze of the film. Incorporating from about 0.5% to about 1% by weight, based on the weight of the film forming composition, of alkali metal alkyl sulfate generally satisfies these requirements.

The incorporation of an alkali metal alkyl sulfate into a thermoplastic film forming composition can be effected in any of several known ways. For instance, a sulfate can be homogeneously incorporated into a thermoplastic material by heating them together to at least the melting point of the thermoplastic in a suitable mixing apparatus, such as a Banbury mixer or heated differential mixing rolls, until a homogeneous mixture is formed, solidifying the mixture by cooling and then comminuting the cooled mixture to a particle size satisfactory for hot-melt extrusion or equivalent heat-shaping opperation to form films. It will be obvious to those skilled in the art that other methods can also be used to incorporate a sulfate.

The incorporation of an alkali metal alkyl sulfate is advantageous for several reasons. First, in using a coating a need to find an adequate solvent is present. Moreover, as a matter of economics a sulfate can simply be incorporated in the thermoplastic by adding it in the procession of the raw thermoplastic; or by adding it to the thermoplastic at the time it is ready to form film. On the other hand, the coating containing a sulfate must be applied after the thermoplastic film is formed, thereby necessitating coating and solvent recovery equipment. Thus, overall processing costs are less when the sulfate is incorporated into the thermoplastic. Another important reason for incorporation is that a coating containing a sulfate may be wiped or washed off the thermoplastic surfaces. Accordingly, the slip and scratch resistance of the film is greatly impaired. In contrast, when a sulfate is incorporated in the thermoplastic film, it is generally believed some of the sulfate will remain therein and not migrate to the film surfaces. Thus, when the migrated portion of the sulfate is removed from the film surfaces, that which remains in the film will migrate to the film surfaces. In this manner, the film retains its improved properties even upon removal of at least the initial portion of the sulfate which has migrated to the film surfaces.

Thermoplastic films imparted with improved slip and scratch resistance according to this invention can contain various additives, as for example dyes, pigments, stabilizers, antioxidants, fillers, cross-linking agents, modifiers and the like.

The following examples are illustrative of this invention and are not intended to limit the same in any manner. Percentages are by weight unless indicated otherwise.

The coefficient of friction data was obtained by taping one piece of the coated film to be tested on a polished rigid sheet, and taping another piece around a rubber covered metal sled. The sled is attached to a strain gauge and pulled across the film on the rigid sheet at a constant speed. The frictional force between the film on the sled and the film on the rigid sheet is read on the strain gauge which is calibrated to give coefficient of friction.

IMPROVED SLIP

Examples 1–6

In these examples, polyethylene film having a density of .92 gram/cc. and a melt index of 2.0 decigrams per minute (ASTM D–1238–57T) was coated using a rubber coating roll and a backup roll in conjunction therewith having an air knife tangentially directing a curtain of air against the uncoated side of the film. The polyethylene film was made hydrophilic prior to coating by passing through a chamber containing chlorine gas irradiated by ultraviolet light at 300 feet per minute. The coating comprised of a latex and varying amounts of commercial grade sodium lauryl sulfate. The latex was an aqueous suspension of a terpolymer having the following composition and properties.

Composition:
    Vinylidene chloride _____parts__ 85
    Vinyl chloride _____do____ 7.5
    n-Butyl acrylate _____do____ 7.5

Properties:
    Reduced viscosity _____ 0.62
    Total solids _____ 26.0–26.5
    Viscosity _____ 2.0
    Specific gravity _____ 1.110
    pH _____ 1.0–2.3

The latex functions to impart grease-proofness and printability to the polyethylene film. After coating, the coated film was oven dried, wound up and tested for coefficient of friction using a sled weighing 240 grams. The results are summarized below in Table I. Uncoated controls and coated controls, coated in the same manner as in the above examples are given in Table II.

TABLE I

|  | Examples ||||||
|---|---|---|---|---|---|---|
|  | 1 | 2 | 3* | 4* | 5 | 6 |
| Polyethylene film thickness, mils | 1.5 | 3.0 | 1.5 | 3.0 | 1.5 | 1.5 |
| Percent sodium lauryl sulfate in latex | ~1.0 | ~1.0 | ~1.0 | ~1.0 | 0.6 | 1.0 |
| Coefficient of friction | 0.096 | 0.19 | 0.11 | 0.27 | 0.11 | 0.11 |

*Both sides coated.

TABLE II

|  | Controls |||||
|---|---|---|---|---|---|
|  | 1 | 2 | 3 | 4 | 5 |
| Polyethylene film thickness, mils | 1.5 | 3.0 | 1.5 | 1.5 | 1.5 |
| Coated | No | No | Yes | Yes | Yes |
| Additive in latex | | | (1) | (1) | (2) |
| Percent additive in latex coating | | | 2.5 | 4.5 | 0.5 |
| Additive designation | | | 1 Triton X–202 | Triton X–202 | 2 Triton X–100 |
| Coefficient of friction | 0.45 | 0.64 | (3) | 0.55 | (3) |

[1] Alkyl aryl polyether sulfate.
[2] Iso-octyl phenyl polyethoxy ethanol.
[3] Incomplete coating.

Example 7

The procedure outlined for Examples 1–6 was followed to coat 1 mil biaxially oriented polystyrene film with the latex described in Examples 1–6 containing 1 percent of sodium lauryl sulfate. The polystyrene film was pretreated as in Examples 1–6. The coefficient of friction for the coated film was 0.12 as compared to an uncoated control film which had a coefficient of friction of 0.3.

Examples 8–12

In these examples, biaxially oriented polystyrene film was coated with an aqueous solution of sodium lauryl sulfate employing the procedure and apparatus described in the copending application of G. M. Harlan et al., Ser. No. 133,832, filed Aug. 25, 1961, and now abandoned. Results are summarized in Table III. In Examples 8–11 the coated film was tested against wax coated cardboard carton stock in obtaining the coefficient of friction values listed, which values are comparable to Control 6, tested in the same manner. In Example 12, the coated film was tested against itself to obtain a coefficient of friction value which is comparable to Control 7, tested in the same manner.

sheet on a heated two-roll mill. Plaques 0.035 inch thick were made from the sheet using a steam heated hydraulic press. The plaques were then biaxially drawn down to 0.001 inch film using a Formvac sheet tester. The film was aged one month and tested for coefficient of friction. Results are summarized in Table V.

TABLE V

|  | Examples | | Control |
|---|---|---|---|
|  | 23 | 24 | 11 |
| Polystyrene film thickness, mils | 1.0 | 1.0 | 1.0 |
| Percent sodium lauryl sulfate incorporated into film | 0.5 | 1.0 | 0 |
| Coefficient of friction | 0.20 | 0.20 | 0.28 |

These examples demonstrate that alkali metal alkyl sulfates effectively improve the slip of thermoplastic films when incorporated therein.

IMPROVED SCRATCH RESISTANCE

Examples 25–27

In these examples, commercially available polystyrene films, coated and uncoated, were subjected to scratching

TABLE III

|  | Example | | | | | Controls | |
|---|---|---|---|---|---|---|---|
|  | 8 | 9 | 10 | 11 | 12 | 6 | 7 |
| Polystyrene film thickness, mils | 1.0 | 1.0 | 1.0 | 1.0 | 1.0 | 1.0 | 1.0 |
| Percent sodium lauryl sulfate in water | 0.5 | 1.0 | 1.5 | [1] 0.5 | 0.5 | [2] | [2] |
| Coefficient of friction | 0.12 | 0.12 | 0.12 | 0.13 | 0.13 | 0.29 | 0.49 |

[1] Contained 0.5% hydroxyethylcellulose fog agent.
[2] Uncoated.

Examples 13–22

Examples 8–12 are duplicated using other sodium alkyl sulfates in addition to sodium lauryl sulfate and polyethylene and polypropylene films in addition to polystyrene film. Results are summarized in Table IV.

and compared to polystyrene films coated with sodium lauryl sulfate as described in Examples 8–12 and subjected to the same scratching. The films were subjected to scratching by sliding a 3″ x 4″ 1000 gram weight covered with crocus cloth over the film. Crocus cloth is

TABLE IV

|  | Examples | | | | | | | | | | Controls | | |
|---|---|---|---|---|---|---|---|---|---|---|---|---|---|
|  | 13 | 14 | 15 | 16 | 17 | 18 | 19 | 20 | 21 | 22 | 8 | 9 | 10 |
| Film | PE | PS | PP | PE | PS | PP | PE | PE | PP | PS | PE | PP | PS |
| Film thickness, mils | 1.0 | 1.5 | 1.0 | 1.0 | 1.5 | 1.0 | 1.0 | 1.0 | 1.0 | 1.5 | 1.0 | 1.0 | 1.5 |
| Alkyl group of sodium alkyl sulfate | [1] | [2] | [3] | [2] | [1] | [4] | [3] | [5] | [2] | [5] | [6] | [6] | [6] |
| Percent sulfate in water | 1.5 | 0.25 | 1.0 | 0.5 | 0.25 | 1.5 | 1.0 | 1.0 | 1.0 | 1.5 |  |  |  |
| Coefficient of friction | 0.22 | 0.13 | 0.34 | 0.19 | 0.16 | 0.30 | 0.24 | 0.23 | 0.26 | 0.17 | 0.7 | 1.0 | 0.49 |

PE=polyethylene; PP=polypropylene; PS=polystyrene.
[1] Oleyl. [2] Lauryl. [3] Myristyl. [4] Stearyl. [5] Cetyl. [6] Uncoated.

The foregoing examples demonstrate that alkali metal alkyl sulfates greatly improve the slip of thermoplastic films as compared to untreated films (Controls 1, 2, 6, 7, 8, 9, and 10) and treated films (Controls 3–5). Table IV further demonstrates that sodium lauryl sulfate consistently produces a lower coefficient of friction as compared to other sodium alkyl sulfates. Examples 8–11, and Control 6, also show that sodium lauryl sulfate greatly improves the slip of thermoplastic films with respect to wax coated cardboard material.

Examples 23 and 24

Sodium lauryl sulfate was compounded with polystyrene in a steam heated Banbury mixer. After obtaining a homogeneous mixture, the mixture was formed into a fabric covered with powdered iron oxide which is generally used for polishing metal. Crocus cloth is similar to emery cloth but is less coarse. After being subjected to scratching, each film was mounted as a slide and coded so that it could be projected on a screen where the scratches can be clearly seen. Each coded slide was projected on a screen with each of the other coded slides. A panel of four persons compared each pair of slides in paired comparison analysis by noting his preference for each pair. The panels' preferences were used to calculate a comparative preference score for each film. The calculations were made according to M. G. Kendall, Rank Correlation Method, Griffen & Co., London, 1955. Results are summarized in Table VI below.

TABLE VI

| | Polystyrene film Commercial Designation | Manufacturer | Coating | Percent Coating | Paired Comparison Analysis Score |
|---|---|---|---|---|---|
| Examples: | | | | | |
| 25 | Kardel-SX GA 1434 | Union Carbide | Sodium lauryl sulfate | 1.0 | 108 |
| 26 | Kardel-SX GA 1434 | do | do | 0.5 | 64 |
| 27 | SGAB-3044 | do | Sodium lauryl sulfate and hydroxyethyl cellulose | [1] 0.5 | 63 |
| Controls: | | | | | |
| 12 | Trycite-1101 | Dow | Unknown | | 66 |
| 13 | Kardel-3000 | Union Carbide | Poly(ethylene oxide) and hydroxyethyl cellulose | [1] 0.33 | 52 |
| 14 | SGAB-3000 | do | None | | 16.5 |
| 15 | Polyflex | Plax | do | | 12 |
| 16 | SGAB-3002 | Union Carbide | Polyvinyl alcohol | 1 | 4.5 |
| 17 | Trycite-1000 | Dow | None | | 1.5 |
| 18 | SGAB-5000 | Union Carbide | do | | −22.5 |
| 19 | Kardel-5000 | do | Monodiglyceride of a fatty acid (internal additive) | 0.5 | −48 |
| 20 | SGAB-3001 | do | Corona treated only | | −51 |
| 21 | SGAB-3042 | do | Hydroxyethyl cellulose | 1 | −64 |
| 22 | SGAB-3042 | do | do | 0.5 | −67 |
| 23 | SGAB-3042 | do | do | 1 | −82 |
| 24 | SGAB-3043 | do | Poly(ethylene oxide) | 0.6 | −99 |

[1] Each.

Table VI demonstrates the vastly superior scratch resistance of a thermoplastic film coated with an alkali metal alkyl sulfate according to the present invention (Examples 25–27) as compared to uncoated commercially available thermoplastic film (Controls 14, 15, 17, and 18), treated films (Control 21), coated films (Controls 12, 13, 16, and 21–24), and films having an internal additive (Control 19).

We claim:

1. A thermoplastic film having improved slip and scratch resistance which consists of a thermoplastic film selected from the group consisting of olefin polymer and styrene polymer films having on at least one surface thereof a coating of an alkali metal alkyl sulfate containing from 8 to 20 carbon atoms in an amount sufficient to impart improved slip and scratch resistance to said film.

2. The article of claim 1 wherein said thermoplastic film is a transparent thermoplastic film.

3. The article of claim 1 wherein said coating has a thickness of from about $1 \times 10^{-4}$ mil to about 0.1 mil.

4. A thermoplastic film having improved slip and scratch resistance consisting of a thermoplastic film selected from the group consisting of olefin polymer and styrene polymer films and homogeneously dispersed therein an alkali metal alkyl sulfate containing from 8 to 20 carbon atoms in an amount of from about 0.5 percent to about 1 percent by weight, based on the weight of said film.

5. The article of claim 4 wherein said thermoplastic film is a transparent thermoplastic film.

6. A film forming composition consisting of a homogeneous mixture of a thermoplastic polymer selected from the group consisting of olefin polymers and styrene polymers and an alkali metal alkyl sulfate containing from 8 to 20 carbon atoms, said alkali metal alkyl sulfate being present in an amount of from about 0.5 percent to about 1 percent by weight based on the weight of said composition to impart improved slip and scratch resistance to a thermoplastic film formed from said film forming composition.

7. The composition of claim 6 wherein said thermoplastic polymer is transparent.

References Cited

UNITED STATES PATENTS 2,676,120   4/1954   Banigan _____ 117—138.8
2,678,285   5/1954   Browning _____ 117—138.8

MORRIS LIEBMAN, *Primary Examiner.*

L. T. JACOBS, *Assistant Examiner.*